(12) United States Patent
Henrion et al.

(10) Patent No.: US 6,812,750 B1
(45) Date of Patent: Nov. 2, 2004

(54) DIVIDED CLOCK GENERATION

(75) Inventors: Carson Donahue Henrion, Fort Collins, CO (US); Gary Lewis Taylor, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/461,088

(22) Filed: Jun. 13, 2003

(51) Int. Cl.[7] .............................................. H03K 21/00
(52) U.S. Cl. ..................................... 327/115; 327/117
(58) Field of Search ................................ 327/115, 117, 327/113, 198, 199, 415; 377/47, 48, 52

(56) References Cited

U.S. PATENT DOCUMENTS 6,271,702 B1 * 8/2001 Stansell ...................... 327/295
6,566,918 B1 * 5/2003 Nguyen ....................... 327/115

* cited by examiner

*Primary Examiner*—Linh M. Nguyen

(57) ABSTRACT

A clock signal is generated in a remote circuit location by generating a source clock signal, providing at least one digital control signal for determining a ratio between a frequency of the clock signal and the source clock signal, transmitting the source clock signal and the at least one digital control signal to the remote circuit region in which the clock signal is to be used, and generating the clock signal in the remote circuit location based on the source clock signal and the at least one digital control signal.

18 Claims, 10 Drawing Sheets

DIVIDED CLOCK GENERATION

BACKGROUND

Most electronic circuits such as microprocessors are synchronous circuits based on clock signals. These clock signals are digital signals which oscillate between a high and a low state such as five volts and zero volts or ground. For example, in a microprocessor operating at 2 gigahertz (gHz), a clock signal in the microprocessor may be oscillating two billion times per second. Various components in the microprocessor use this clock signal to time movement of data or instructions through the microprocessor. For example, one component used extensively in synchronous electronic circuits such as microprocessors is a latch, a component that stores a bit of data. A typical latch has a data input, a clock input, and a data output. When the clock connected to the clock input changes state from low to high, the information (or voltage level) at the data input is copied into the latch and becomes available at the data output, staying in the latch until the clock has oscillated through an entire cycle and again transitions from low to high.

Clock signals, particularly in high speed electronic circuits, are very sensitive signals and are critical to proper operation. Extreme care is taken during the design of the electronic circuit to route the conductors carrying the clock signals properly to minimize interference and to minimize skew, or differences in clock arrival times throughout the circuit. All electrical signals, including clock signals, tend to degrade as they travel over long conductors, so routing of conductors carrying critical clock signals can be a difficult and time-consuming part of the design process. Clock signals are also delayed when they travel across long distances, requiring considerable effort during the design to prevent errors.

Another difficulty when designing synchronous electronic circuits that clock generation circuitry generally requires relatively large analog components, such as phase locked loops (PLLs) which should be isolated from noisy digital circuit regions.

Typical synchronous electronic circuits require multiple clock signals running at various frequencies, such as a core clock and several divided clocks running at various frequencies relative to the core clock. This multiplies the difficulties described above, such as placing multiple analog phase locked loop clock generators and routing multiple clock signal conductors throughout the electronic circuits.

SUMMARY

An exemplary embodiment may comprise an apparatus for generating a divided clock signal, including a buffer circuit having an input and an output, the input being connected to a source clock, the output providing at least one buffered source clock. The apparatus also comprises a plurality of latch chains each having an input and an output, the plurality of latch chains being clocked by the at least one buffered source clock, the plurality of latch chain inputs being connected to a plurality of digital control signals. The apparatus also comprises a combinatorial logic block having a plurality of inputs connected to the plurality of latch chain outputs and to the source clock, and having an output providing a divided clock based on the source clock and aligned with the buffered source clock.

Another exemplary embodiment may comprise a method of generating a clock signal in a remote circuit location, including generating a source clock signal, providing at least one digital control signal for determining a ratio between a frequency of the clock signal and the source clock signal, transmitting the source clock signal and the at least one digital control signal to the remote circuit region in which the clock signal is to be used, and generating the clock signal in the remote circuit location based on the source clock signal and the at least one digital control signal.

Another exemplary embodiment may comprise a clock generation circuit, including means for generating a source clock signal, means for generating a plurality of digital control signals, means for transmitting the source clock signal and the plurality of digital control signals to a remote circuit region where a divided clock is needed, and means for generating the divided clock in the remote circuit region based on the source clock signal and the plurality of digital control signals.

BRIEF DESCRIPTION OF THE DRAWINGS

Illustrative embodiments are shown in the accompanying drawings, in which.

DESCRIPTION

Figure 1:
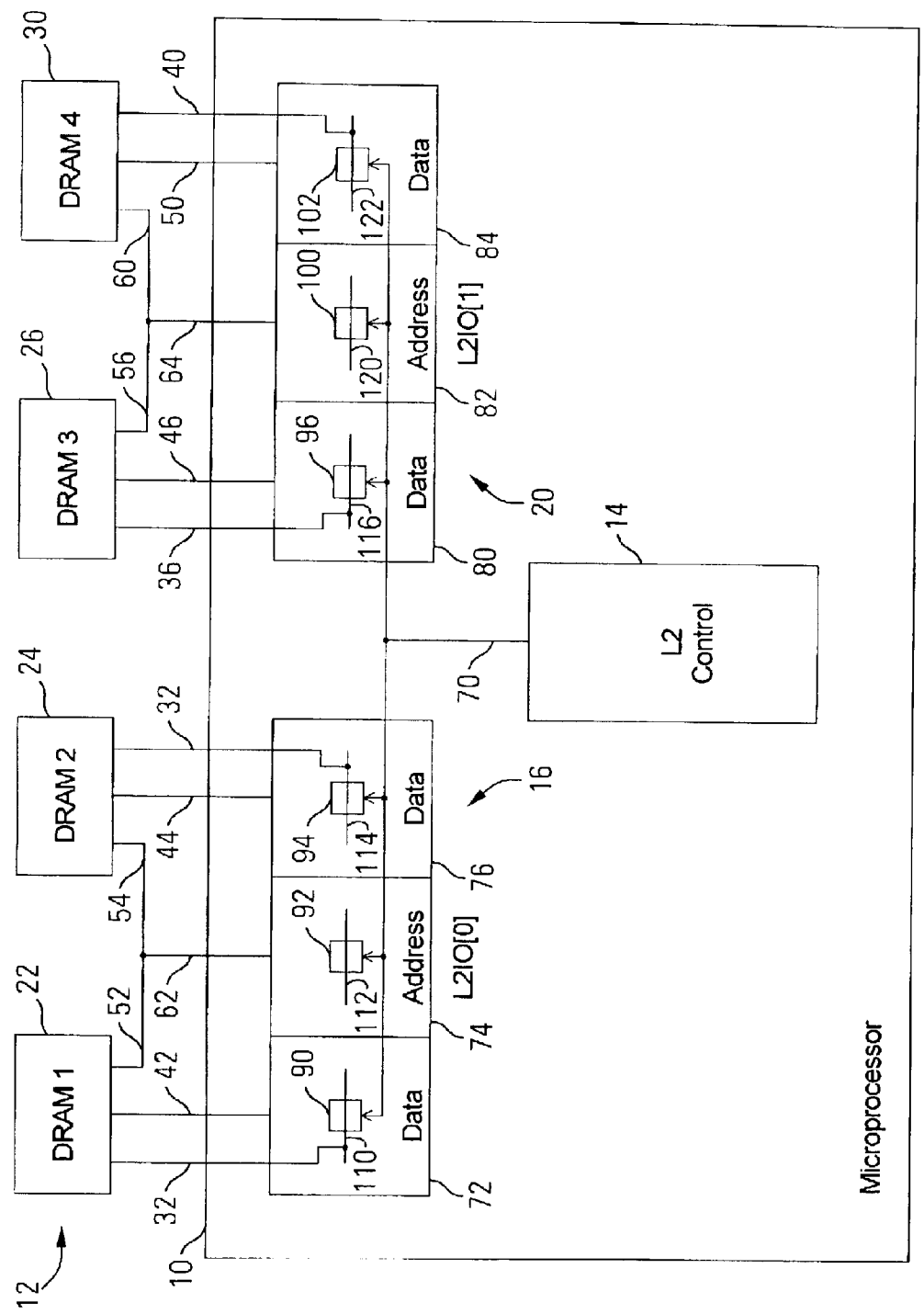
FIG. 1 is a block diagram of an exemplary microprocessor that generates divided clock regions for external DRAM control blocks in the microprocessor.

The drawing and description, in general, disclose a method and apparatus for generating a divided clock from a source clock in a remote region of an electronic circuit. A single source clock (or core clock) is generated in an electronic circuit, along with one or more digital control signals which determine the frequency of a divided clock relative to the source clock. The source clock and the digital control signals are routed to regions in the electronic circuit in which a divided clock is needed, and the divided clock is generated locally based on the source clock using the digital control signals. This allows multiple clocks of various frequencies to be provided in remote regions of an electronic circuit without requiring multiple central clock generators. This also reduces clock routing difficulties because multiple source clocks need not be routed throughout the electronic circuit. Because the source clock is typically already routed everywhere throughout an electronic circuit with great care to prevent race conditions, divided clock generators may be placed anywhere needed in the circuit without affecting the source clock routing. The generation of local divided clocks also provides much greater flexibility in adjusting clock delays, because if a divided clock is generated in several remote locations, a given component in the electronic circuit may access the divided clock from one of multiple sources at different distances, thus having different delays.

The term "divided clock" is used herein to refer to a clock which is generated based on a source clock and which may be generated with or divided into various frequencies relative to the source clock frequency, such as at ratios of 1:1, 2:3, 1:2, or 1:16, etc. Note that this includes the case in which the divided clock frequency is identical to the source clock frequency. The "source clock" is any clock that is used as the source from which the divided clock is derived. In the exemplary embodiment described herein, the source clock is the core clock of a microprocessor 10.

An exemplary electronic circuit in which divided clocks are remotely generated is illustrated in the block diagram of FIG. 1. A microprocessor 10 is connected to multiple external dynamic random access memories (DRAMs) 12 which are used as a level two (L2) cache. The block diagram of FIG. 1 illustrates the integrated circuit layout of the microprocessor 10 and the connections to the external DRAMs 12. A core clock or source clock is generated in the microprocessor 10 for use throughout the microprocessor 10. The source clock is generated by any suitable clock generation circuitry. In the exemplary embodiment, the source clock is generated using a phase locked loop (not shown) located in a central location in the microprocessor 10 so that the conductors or traces carrying the source clock signal can be routed to various locations in the microprocessor 10 with the minimum possible skew.

The microprocessor 10 also includes circuitry for controlling the external DRAMs 12. Before describing the generation of divided clocks, the DRAM control circuitry will be briefly described. This control circuitry provides clock signals 32, 34, 36 and 40 to the DRAMs 12, address lines 62 and 64 indicating what storage locations in the DRAMs 12 are being accessed, and data lines 42, 44, 46 and 50 for transferring information between the DRAMs 12 and the microprocessor 10. An L2 control block 14 is located in the core of the exemplary microprocessor and two L2 input/output (I/O) blocks 16 and 20 are located nearer the external connections to the DRAMs 12. Although various signals 70 may be connected between the L2 control block 14 and the L2I/O's 16 and 20, only those relevant to the generation of divided clocks will be discussed herein. The L2 control block 14 generally controls the clocking of the DRAMs 12, and the L2I/O's 16 and 20 control the data and address lines to the DRAMs 12. The arrangement of the L2I/O's 16 and 20 is not important in the divided clock generation, but is arranged this way in the exemplary microprocessor 10 to form wide data words using narrower DRAMs, e.g., using four 36 bit wide DRAMs in parallel to form a 144 bit data word (of which some portion may or may not comprise error correction bits). Each DRAM chip 22, 24, 26 and 30 has a clock signal 32, 34, 36 and 40, respectively, a data bus 42, 44, 46 and 50, respectively, and an address bus 52, 54, 56 and 60, respectively. Each L2I/O block 16 and 20 in the exemplary microprocessor 10 controls two DRAMs 22, 24 and 26, 30. Although an independent data bus 42, 44, 46 and 50 is provided for each DRAM 22, 24, 26 and 30, each L2I/O block 16 and 20 provides a single address bus 62 and 64, respectively, which is shared by the two DRAM's 22, 24 and 26, 30 connected to each L2I/O block 16 and 20. Other signals as needed may be routed between the DRAMs 12, the L2I/O's 16 and 20 and the L2 control 30 block 14, such as read/write signals, etc.

Each L2I/O 16 and 20 is divided into three regions 72, 74, 76 and 80, 82, 84, respectively. Each region 72, 74, 76, 80, 82, and 84 contains a divided clock generator 90, 92, 94, 96, 100, and 102, having as input the source clock and four digital control signals 70 from the L2 control block 14. Each divided clock generator 90, 92, 94, 96, 100, and 102 generates a divided clock 110, 112, 114, 116, 120 and 122, which may be used in the six regions 72, 74, 76, 80, 82, and 84, in the external DRAMs 12, or anywhere else desired in the microprocessor 10.

Turning now to a description of divided clock generation, the source clock from which the divided clock is generated is routed 70 from the L2control block 14 to the L2I/O's 16 and 20. The source clock may be used for clocking various components in the L2I/O's 16 and 20, as well as elsewhere in the microprocessor 10, but a slower clock is generally used for external components such as the DRAMs 12. Clock signals traveling between electronic circuits are typically slower than those used internally, such as the source clock of a microprocessor 10, due to various constraints such as the difficulty of running an extremely fast clock signal externally between components without degradation, or physical limitations of the slower components like DRAMs 12. Examples will be given below of generating a divided clock at various frequencies relative to the source clock, including at ratios of 1:1, 2:3, and 1:2, although the divided clock may be generated with other relative frequencies. The divided clock disclosed herein may therefore be generated at a lower frequency than the source clock for use with external components (e.g., 12) or elsewhere in the microprocessor 10 where a slower clock is needed. Note that the divided clock disclosed herein is useful not only because its frequency may be varied, but also because it acts as a buffer to reduce the load on the source clock.

One or more digital control signals for determining the ratio between the frequency of the divided clock and the source clock are generated in the L2control block 14 and are routed 70 along with the source clock to the L2I/O's 16 and 20. In the exemplary microprocessor 14, four digital control signals are provided for use in generating a divided clock, as will be described below. The routing of the four digital control signals may not be as critical as the routing of the source clock, because the state of the digital control signals is used in the divided clock generation, not the edges, so edge degradation such as slow rise and fall times in the four digital control signals is not as problematic as it would be in a clock signal such as the source clock.

Figure 8:
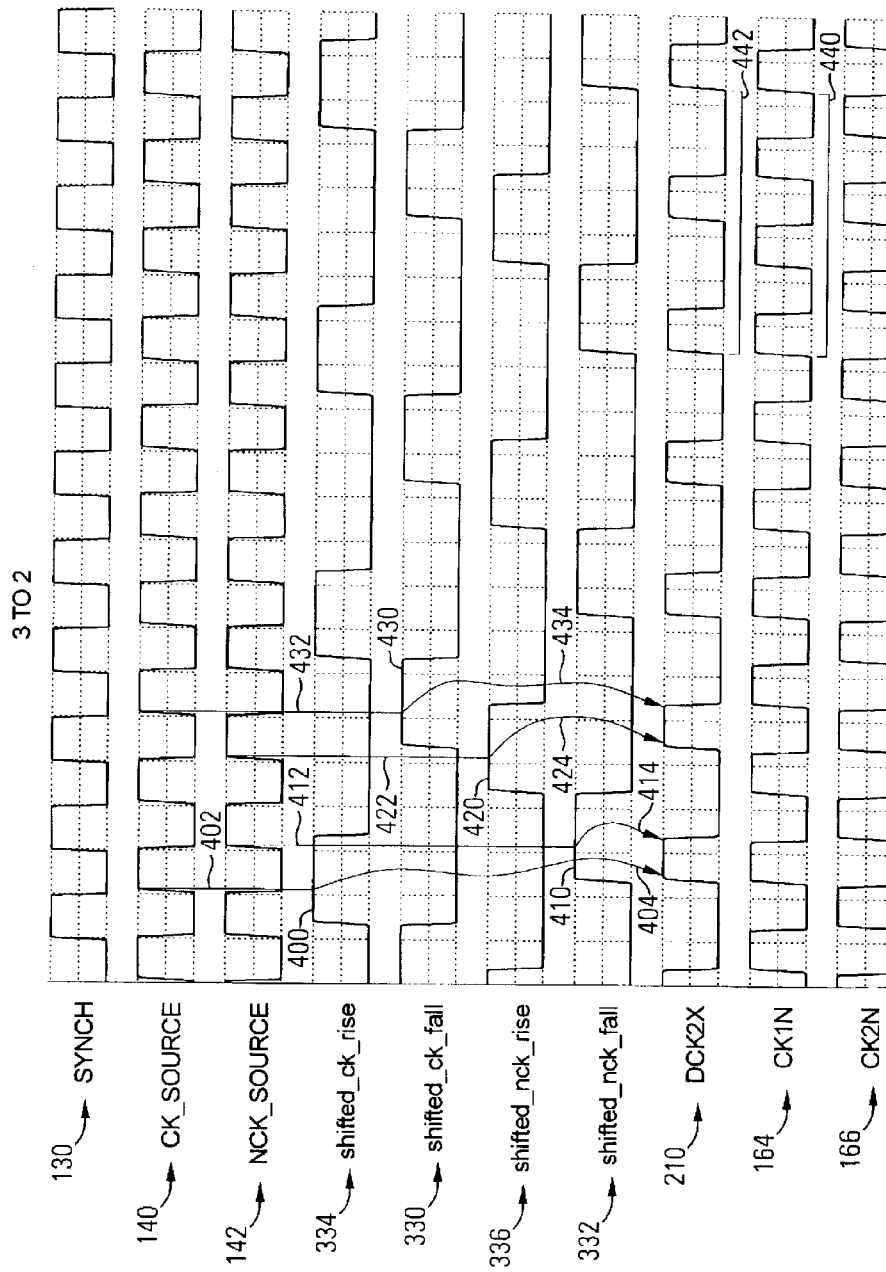
FIG. 8 is a timing diagram illustrating exemplary timing of various control and clock signals in the exemplary clock circuit of FIG. 3 during the generation of a divided clock signal having a ratio of 2 to 3 with the original clock signal.
Figure 10:
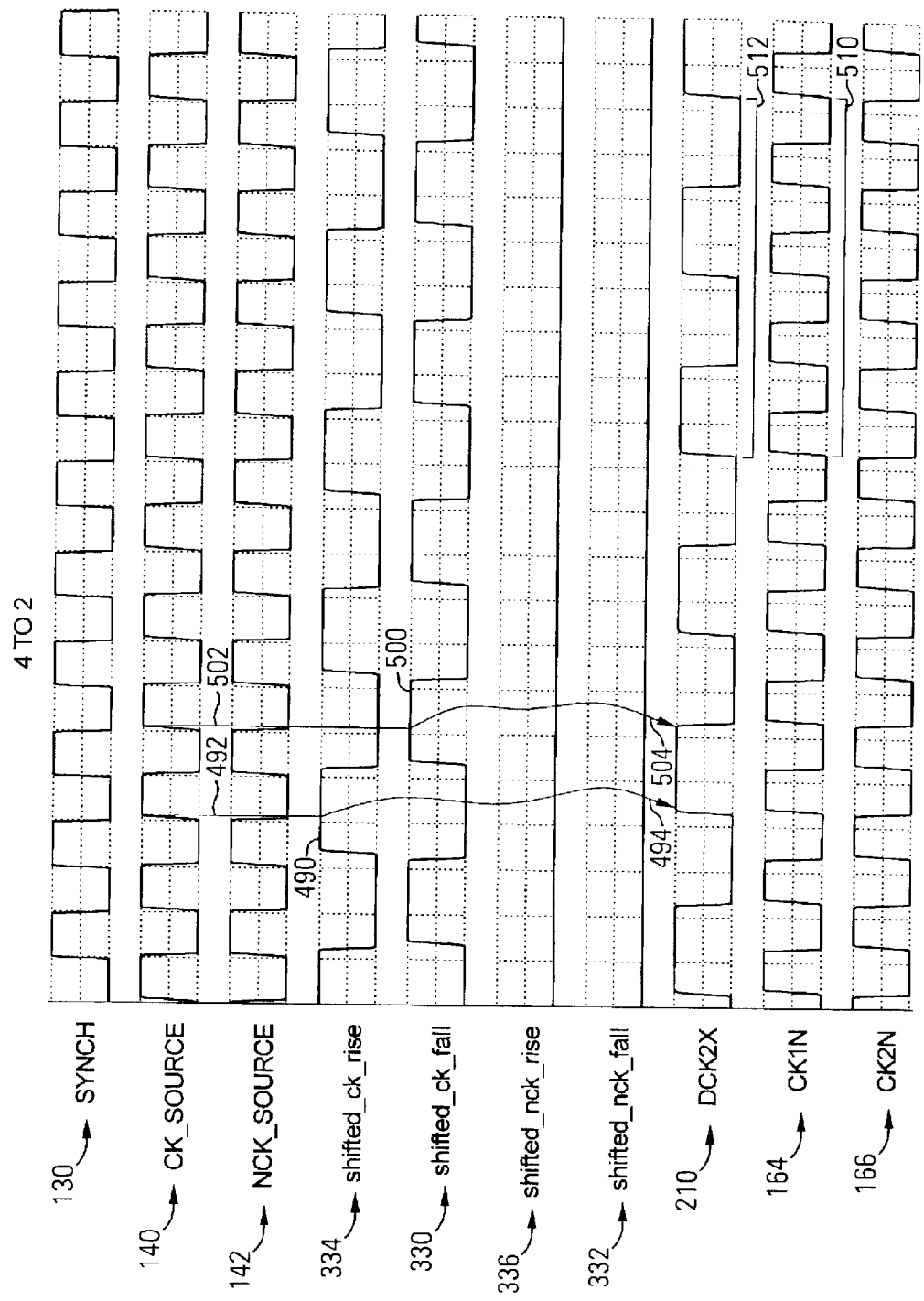
FIG. 10 is a timing diagram illustrating exemplary timing of various control and clock signals in the exemplary clock circuit of FIG. 3 during the generation of a divided clock signal having a ratio of 2 to 4 with the original clock signal.

In thie exemplary microprocessor 10, the source clock generator and the L2control block 14 are located in the microprocessor core. The digital control signals are generated in the L2control block 14 using any suitable method. The digital control signals are digital signals whose state may remain constant during operation or may vary in regular patterns to generate the desired divided clock, as will be discussed in more detail below. (A divided clock with a varying frequency may even be generated by varying the pattern on the digital control signals. Timing diagrams showing exemplary regular patterns in the digital control signals are illustrated in FIGS. 8 and 10, with the digital control signals labeled shifted_ck_rise, shifted_ck_fall, shifted_nck_rise, and shifted_nck_fall.) As mentioned above, the states of the digital control signals are used, not the rising or falling edges, so the timing of the digital control signals is not as critical as a clock signal. However, the state of the digital control signals should be stable when the source clock transitions, so the circuits used to generate the digital control signals are synchronous and are based on the source clock. An exemplary method of generating the digital control signals would be to use digital counters counting cycles in the source clock and resetting at a predetermined value to generate the desired output pattern.

Note that although the L2control block 14 is in the core of the exemplary microprocessor 10 and is therefore near the source clock generator, the L2control block 14 may alternatively be located in any desired location. In typical synchronous electronic circuits, the source clock is already carefully routed throughout the circuit so that it is available at any location, without having to worry about race conditions. In alternative embodiments, the source clock may be routed to divided clock regions for use with the four digital control signals.

Figure 5A:
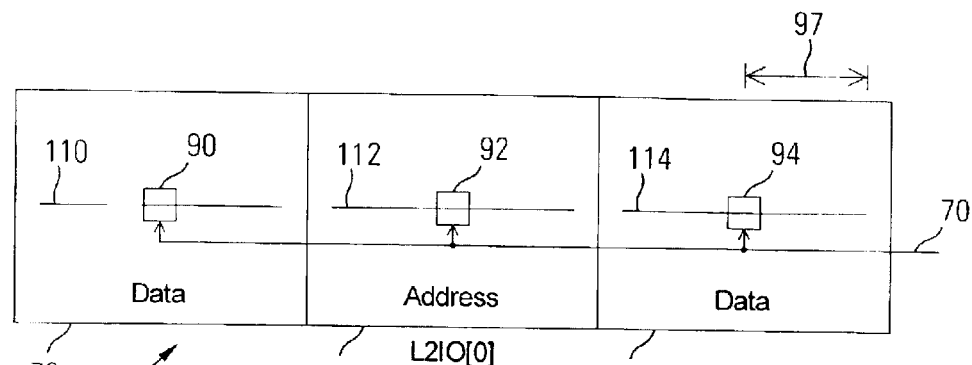
FIGS. 5A and 5B are block diagrams of an exemplary DRAM control block illustrating clock skews for various placements of divided clock generators.
Figure 5B:
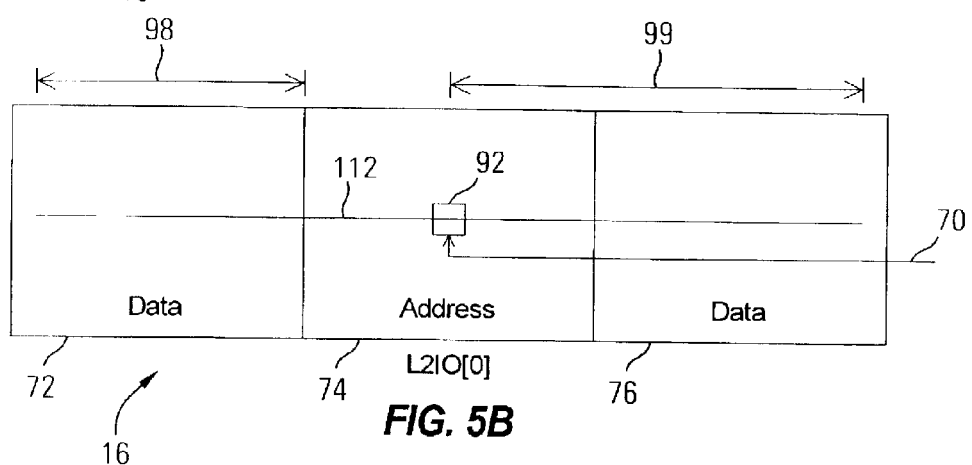

Referring now to FIGS. 5A and 5B, clock skew management will be described. By placing local divided clock generators 90, 92 and 94 (FIG. 5A) in the center of each local region 72, 74 and 76, a maximum clock skew 97 inside each region (e.g., 76) is minimized. That is, the delay caused when the clock signal travels across a conductor is minimized because the length of the conductor is minimized from the divided clock generator (e.g., 94) to the farthest component in the region (e.g., 76) using the divided clock (e.g., 114). This enables the designer to ensure that all signals generated in the local regions 72, 74 and 76 based on the divided clocks 110, 112, and 114 are as synchronous as possible. In contrast, if a central clock were used, or fewer local divided clock generators (92, FIG. 5B), the maximum clock skew is increased, both the clock skew 9B within a local region 72 and the clock skew 99 across a network.

Figure 2:
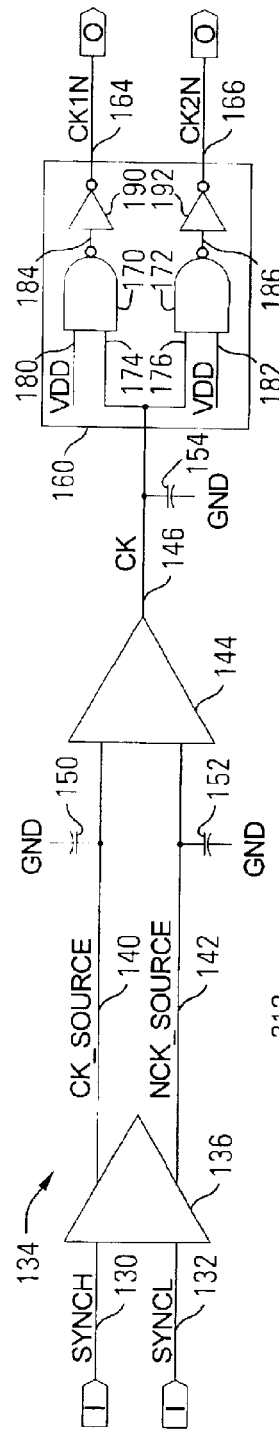
FIG. 2 is a schematic of an exemplary clock circuit.
Figure 3:
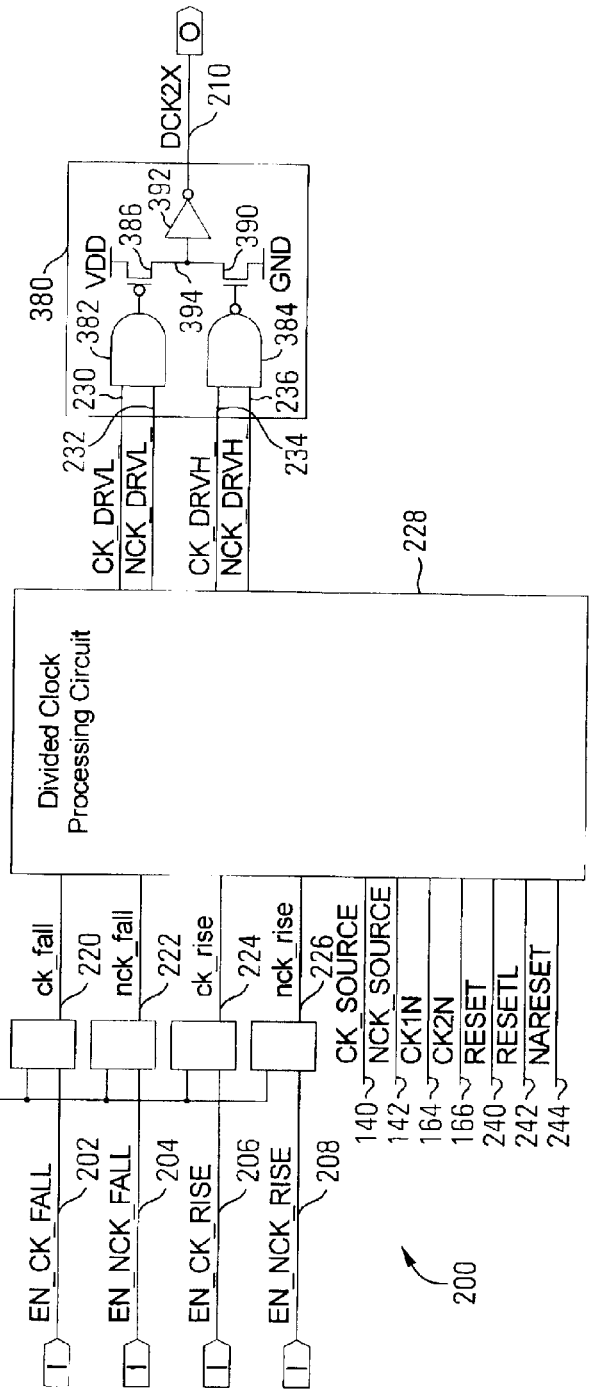
FIG. 3 is a schematic of an exemplary circuit for generating a divided clock.
Figure 4:
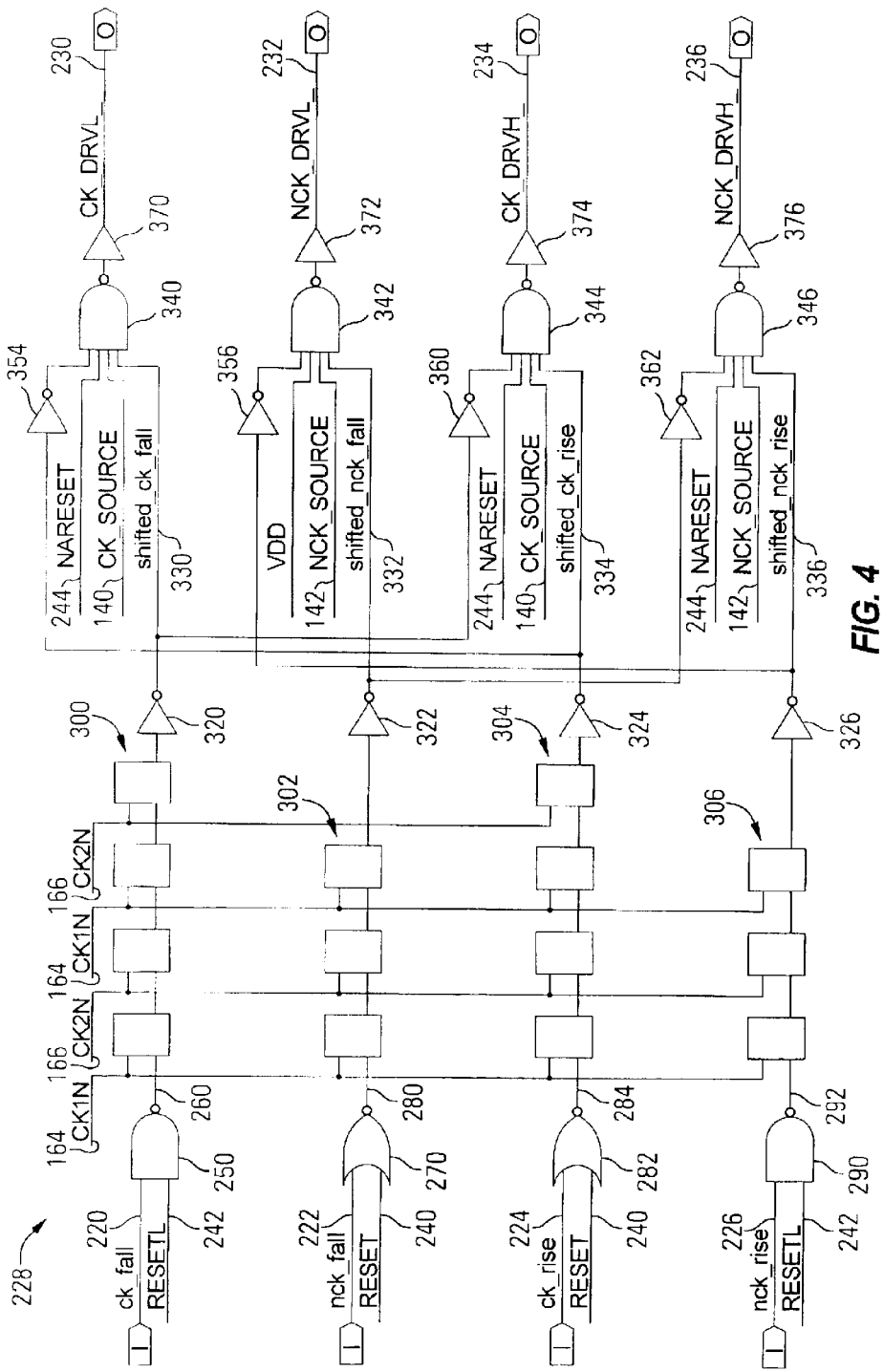
FIG. 4 is a schematic showing more detail for a portion of the exemplary circuit of FIG. 3.

Referring now to FIGS. 2–4, the generation of a divided clock will be described in more detail. In the exemplary embodiment, the source clock is a differential signal carried on two conductors SYNCH 130 and SYNCL 132 (FIG. 2). A source clock buffer circuit 134 is illustrated in FIG. 2. A differential buffer 136 is connected to the source clock SYNCH 130 and SYNCL 132 to provide a buffered copy CK_SOURCE 140 and NCK_SOURCE 142. A differential terminator 144 is connected to CK_SOURCE 140 and NCK_SOURCE 142 to provide a non-differential source clock CK 146. The CK 146 version of the source clock is still a fairly high level clock signal, so low level components in the microprocessor 10 such as latches would generally not be connected directly to CK 146 to avoid loading it excessively. Another buffer 160 is used to buffer CK 146 and to provide two non-overlapping clock signals CK1N 164 and CK2N 166. The exemplary buffer 160 is comprised of two 2-input NAND gates 170 and 172, with one input 174 and 176 of each connected to CK 146, and the other input 180 and 182 of each connected to VDD to provide a constant high or true value. The outputs 184 and 186 are connected to inverters 190 and 192, respectively, which provide buffered non-overlapping source clocks CK1N 164 and CK2N 166. These buffered source clocks 164 and 166 may be used throughout the microprocessor 14 (subject to their load limits) or in divided clock regions alongside the divided clock.

The divided clock generator 200 is illustrated in FIG. 3, with the four digital control signals EN_CK_FALL 202, EN_NCK_FALL 204, EN_CK_RISE 206 and EN_NCK_RISE 208 as inputs from the left resulting in the divided clock DCK2X 210 as an output on the right. The four digital control signals EN_CK FALL 202, EN_NCK_FALL 204, EN_CK RISE 206 and EN NCK RISE 208 are aligned with the buffered source clock CK_SOURCE 140 and NCK_SOURCE 142. The divided clock DCK2X 210 is aligned with the buffered non-overlapping source clocks CK1N 164 and CK2N 166. This allows the source clocks CK1N 164 and CK2N 166 to be used alongside the divided clock DCK2X 210 without concern for delays or skewing between them. Alternatively, any desired skew or delay of the divided clock DCK2X 210 or source clocks CK1N 164 and CK2N 166 may be achieved with known techniques such as adding wire or gate delays.

The four digital control signals EN_CK_FALL 202, EN_NCK_FALL 204, EN_CK_RISE 206 and EN_NCK_RISE 208 are latched by four latches 212 which are clocked by CK2N 166 to produce four preliminary latched digital control signals ck_fall 220, nck_fall 222, ck_rise 224 and nck_rise 226. These four preliminary latched digital control signals ck_fall 220, nck_fall 222, ck_rise 224 and nck_rise 226 are used along with seven other inputs in a divided clock processing circuit 228 to generate four active low output signals CK_DRVL_ 230, NCK_DRVL_ 232, CK_DRVH_ 234 and NCK_DRVH_ 236. The seven other inputs to the divided clock processing circuit 228 are buffered source clock signals CK_SOURCE 140 and NCK_SOURCE 142, CK1N 164 and CK2N 166, and three reset lines RESET 240, RESETL 242, and NARESET 244.

The naming conventions used herein for the four digital control signals indicate the function of each of the four digital control signals with respect to the divided clock. The names of the four digital control signals (e.g., ck_fall) are made up of two sections, a first section (ck or nck) that indicates the source clock edge at which the divided clock should transition, and a second section (rise or fall) that indicates the direction of the transition of the divided clock. Thus, in the first section, a 'ck' indicates that the rising edge of the source clock is the trigger, and an 'nck' indicates that the falling edge of the source clock is the trigger. In the second section, a 'rise' indicates that the divided clock should transition high, and a 'fall' indicates that the divided clock should transition low. For example, if the ck_fall signal is active when the source clock rises, or transitions high, the divided clock should fall, or transition low. If the nck_rise signal is active when the source clock falls, or transitions low, the divided clock should rise, or transition high.

Referring now to FIG. 4, the divided clock processing circuit 228 will be described. Each of the four preliminary latched digital control signals ck_fall 220, nck_fall 222, ck_rise 224 and nck_rise 226 is first combined with a reset signal so that the divided clock DCK2X 210 behaves properly at powerup and after reset.

Figure 6:
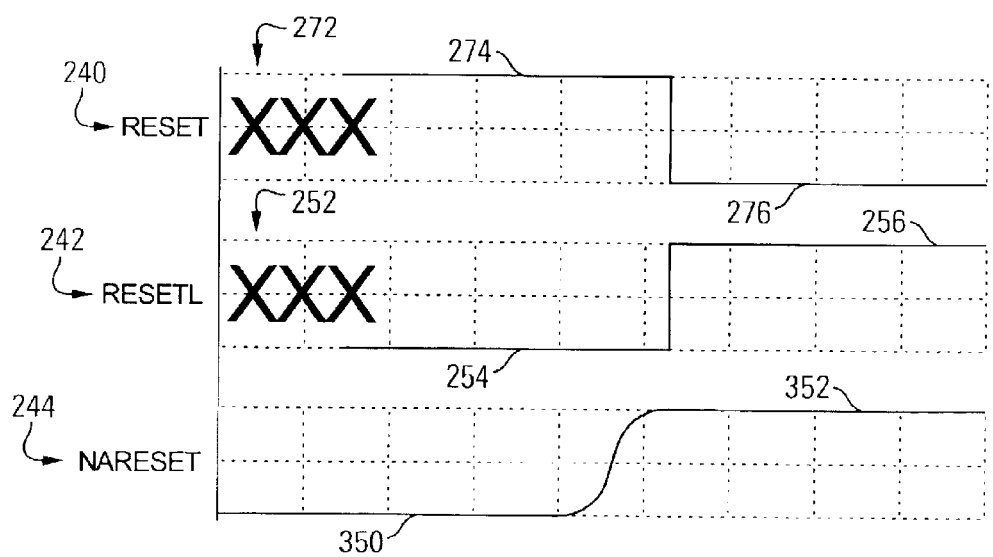
FIG. 6 is a timing diagram illustrating exemplary timing of three reset signals in the exemplary clock circuit of FIG. 3.

The first preliminary latched digital control signal ck_fall 220 is combined with a RESETL signal 242 in a two-input NAND gate 250. The RESETL signal 242 is a synchronous signal that is in an unknown state 252 (see FIG. 6) during initial powerup, as illustrated in the timing diagram of FIG. 6, and shortly thereafter is in a low state 254 for a short time, and finally goes high 256 on an edge of the CK 146 source clock. The resulting signal 260 from the NAND gate 250 is therefore in an unknown state initially due to the unknown state 252 of the RESETL signal 242, then is forced to a high condition until RESETL 242 goes high 256, at which point the resulting signal 260 from the NAND gate 250 is the inverse of the ck_fall 220 signal.

The second preliminary latched digital control signal nck_fall 222 is combined with a RESET signal 240 in a NOR gate 270. The RESET signal 240 is a synchronous signal, inverse to the RESETL signal 242, that is in an unknown state 272 (see FIG. 6) after powerup, as illustrated in the timing diagram of FIG. 6, and shortly thereafter is in a high state 274 for a short time, and finally goes low 276 on an edge of the CK 146 source clock. The resulting signal 280 from the NOR gate 270 is therefore in an unknown state initially due to the unknown state 272 of the RESET signal 240, then is forced to a low condition until RESET 240 goes low 276, at which point the resulting signal 280 from the NOR gate 270 is the inverse of the nck_fall 222 signal.

The third preliminary latched digital control signal ck_rise 224 is also combined with the RESET signal 240 in a NOR gate 282. The resulting signal 284 is therefore the inverse of the ck_rise 224 signal after the reset sequence.

The fourth preliminary latched digital control signal nck_rise 226 is also combined with the RESETL signal 242 in a two-input NAND gate 290. The resulting signal 292 is therefore the inverse of the nck_rise 226 signal after the reset sequence.

Each of the resulting signals 260, 280, 284 and 292 are latched in a latch chain 300, 302, 304 and 306, respectively. The latch chains 300, 302, 304 and 306 stage up the four digital control signals 202, 204, 206 and 208 so that they are available from the last latches in the latch chains 300, 302, 304 and 306 when CK1N 164 and CK2N 166 transition. The ck_rise 224 and ck_fall 220 latch chains 304 and 300 include one more latch than the nck_rise 226 and nck_fall 222 latch chains 306 and 302 (four latches rather than three) simply so that the states of the digital control signals are present and stable at the proper source clock transitions, as will be described below with respect to the timing diagrams.

Each of the digital control signals are reinverted in an inverter 320, 322, 324 and 326 after passing through the latch chains 300, 302, 304 and 306, restoring their original sense, resulting in shifted digital control signals shifted_ck_fall 330, shifted_nck_fall 332, shifted_ck_rise 334 and shifted_nck_rise 336.

The shifted digital control signals 330, 332, 334 and 336 are combined with the source clock, reset signals and error-preventing inputs in NAND gates 340, 342, 344 and 346. As will be discussed in more detail below, the state of the shifted digital control signals 330, 332, 334 and 336 is stable when the source clock transitions at the inputs to the NAND gates 340, 342, 344 and 346.

The four digital control signals 202, 204, 206 and 208 cross from the CK1N 164 clock domain to the CK_SOURCE 140 clock domain in the NAND gates 340, 342, 344 and 346, because the CK_SOURCE 140 clock signal is used as the timing event at which the NAND gates 340, 342, 344 and 346 change states.

The shifted_ck_fall signal 330 is combined with the CK_SOURCE clock signal 140 in the first NAND gate 340, a four input NAND gate, along with a reset signal NARESET 244, and an inverted version of the shifted_ck_rise signal 334 for error prevention. The NARESET signal 244 is an asynchronous reset signal (see FIG. 6) that is low 350 on powerup or reset, and asynchronously goes high 352 sometime before the RESET 240 and RESETL 242 signals transition to their normal operating states. The NARESET signal 244 is low on powerup, forcing the output of the NAND gate 340 high so that the resulting active low signal CK_DRVL_ 230 is high and inactive on powerup. The NARESET signal 244 is used at this point in the circuit rather than before the latch chain 300 because the source clock signals CK1N 164 and CK2N 166 are undefined on powerup, so the NARESET signal 244 could not propagate through the latch chain 300 during powerup.

The shifted_ck_rise signal 334 is inverted in an inverter 354 and connected to an input of the NAND gate 340 to prevent error conditions if both ck_fall 220 and ck_rise 224 were inadvertently asserted simultaneously. As will be discussed later, additional error prevention circuitry may be added if desired to handle other forbidden states in the divided clock generator.

The active low output CK_DRVL_ signal 230 is therefore low (and asserted) only when NARESET 244 is high, the source clock CK_SOURCE 140 is high, shifted_ck_fall 330 is high and shifted_ck_rise 334 is low. Note that, as discussed above, the states of the shifted digital control signals (e.g., shifted ck_fall 330 and shifted_ck_rise 334) are stable when the source clock CK_SOURCE 140 transitions, causing the NAND gate 340 to transition when the source clock CK_SOURCE 140 transitions. This aligns the active low output signal CK_DRVL_230 with the source clock CK_SOURCE 140 rather than with the digital control signals.

The shifted_nck_fall signal 332 is combined with the NCK_SOURCE inverted clock signal 142 in the second NAND gate 342, a four input NAND gate, along with an inverted version of the shifted_nck_rise signal 336 (inverted in inverter 356) for error prevention. The remaining input of the second NAND gate 342 is connected to VDD, allowing the divided clock DCK2X 210 to resolve to a low state when the source clock transitions low before the NARESET signal 244 goes high. The resulting active low output signal NCK_DRVL_ 232 is therefore low (and asserted) only when the inverted source clock NCK_SOURCE 142 is high, shifted_nck_fall 332 is high and shifted_nck_rise 336 is low.

The shifted_ck_rise signal 334 is combined with the CK_SOURCE clock signal 140 in the third NAND gate 344, a four input NAND gate, along with the NARESET signal 244 and an inverted version of the shifted_ck_fall signal 330 (inverted in inverter 360) for error prevention. The resulting active low output signal CK_DRVH_ 234 is therefore low (and asserted) only when the source clock CK_SOURCE 140 is high, NARESET 244 is high, shifted_ck_rise 334 is high and shifted_ck_fall 330 is low.

The shifted_nck_rise signal 336 is combined with the NCK_SOURCE inverted clock signal 142 in the fourth NAND gate 346, a four input NAND gate, along with the NARESET signal 244 and an inverted version of the shifted_nck_fall signal 332 (inverted in inverter 362) for error prevention. The resulting active low output signal NCK_DRVH_ 236 is therefore low (and asserted) only when the inverted source clock NCK_SOURCE 142 is high, NARESET 244 is high, shifted_nck_rise 336 is high and shifted_nck_fall 332 is low.

The resulting active low outputs CK_DRVL_ 230, NCK_DRVL_ 232, CK_DRVH_ 234 and NCK_DRVH_ 236 are buffered through buffers 370, 372, 374 and 376, respectively.

Note that after a reset condition (when the three reset signals RESET 240, RESETL 242 and NARESET 244 are in their normal operating state) and before the four digital control signals have been configured, the RESET 240 signal asserts the shifted_ck_rise 334 and shifted_nck_fall 332 through NOR gates 270 and 282, placing the divided clock DCK2X 210 in a 1:1 ratio with the source clock by default. In alternative embodiments other default ratios may be selected.

Referring again Lo FIG. 3, an exemplary buffer/combining circuit 380 for combining and buffering the four active low output signals CK_DRVL_ 230, NCK_DRVL_ 232, CK_DRVH_ 234 and NCK_DRVH_ 236 will be described. The buffer/combining circuit 380 includes a two input AND gate 382 and a two input NAND gate 384 connected in parallel to the four active low output signals CK_DRVL_ 230, NCK_DRVL_ 232, CK_DRVH_ 234 and NCK_DRVH_ 236. The resulting outputs from the AND gate 382 and NAND gate 384 are connected to the gates of a pullup PFET transistor 386 and a pulldown NFET transistor 390 connected in series between power and ground, with an inverter 392 connected to an output node 394 between the pullup PFET 386 and pulldown NFET 390. The divided clock DCK2X 210 appears at the output of the inverter 392.

The CK_DRVL_ 230 and NCK_DRVL_ 232 active low output signals, either of which cause the divided clock DCK2X to transition low, are connected to the two inputs of the AND gate 382. When both CK_DRVL_ 230 and NCK_DRVL_ 232 active low output signals are inactive (high), the AND gate 382 produces a high output which turns off the pullup PFET transistor 386, disconnecting the output node 394 from power. When either or both CK_DRVL_ 230 and NCK_DRVL_ 232 active low output signals are active (low), the AND gate 382 produces a low output which turns on the pullup PFET transistor 386, connecting the output node 394 to power.

The CK_DRVH_ 234 and NCK_DRVH_ 236 active low output signals, either of which cause the divided clock DCK2X to transition high, are connected to the two inputs of the NAND gate 384. When both CK_DRVH_ 234 and NCK_DRVH_ 236 active low output signals are inactive (high), the NAND gate 384 produces a low output which turns off the pulldown NFET transistor 390, disconnecting the output node 394 from ground. When either or both CK_DRVH_ 234 and NCK_DRVH_ 236 active low output signals are active (low), the NAND gate 384 produces a high output which turns on the pulldown NFET transistor 390, connecting the output node 394 to ground.

The output node 394 is inverted by the inverter 392. Therefore, either CK_DRVL_ 230 or NCK_DRVL_ can make the divided clock DCK2X 210 low by turning on the pullup PFET transistor 386, pulling the output node 394 up, which in turn pulls down the divided clock DCK2X 210 through the inverter 392. Either CK_DRVH_ 234 and NCK_DRVH_ 236 can make the divided clock DCK2X 210 high by turning on the pulldown NFET transistor 390, which in turn pulls up the divided clock DCK2X 210.

While an exemplary embodiment of divided clock generation in a remote region of an electronic circuit has been described in detail herein, it is important to note that the divided clock generator may be adapted to the requirements of other electronic circuits in various ways without departing from the scope of the inventive concepts disclosed herein. For example, the four digital control signals described herein may be replaced with other control methods, such as using two digital control signals whose state causes the divided clock to either rise or fall on any detected transition of a source clock, or one or more control signals whose edges toggle a state machine in a divided clock generator making a next detected transition of a source clock cause a different action in the divided clock, etc.

In other alternative embodiments, the timing or delay of various signals in the divided clock generator may be adapted as desired. For example, clock signals may be delayed or advanced by inverting them to alter their timing by a half cycle, or by including an inverter chain to introduce additional gate delays. In one specific example, referring to FIG. 4, the source clocks CK_SOURCE 140 and NCK_SOURCE 142 may be delayed before reaching the inputs to the NAND gates 340, 342, 344, and 346 if desired so that they transition only after the states of the shifted digital control signals shifted_ck_fall 330, shifted nck_fall 332, shifted_ck_rise 334 and shifted nck_rise 336 are stable.

In other alternative embodiments, signals at various points throughout the divided clock generator may be adapted to be active high or active low signals if desired, by including inverters or by selecting the proper logic gates. In the exemplary embodiment, the divided clock generator is designed to maintain a desired gate delay, that is, so that a gate delay between CK_SOURCE 140 and DCK2X 210 is equal to that between CK_SOURCE 140 and CK1N 164, thereby keeping the divided clock DCK2X 210 aligned with the buffered source clock CK1N 164. In alternative embodiments, this alignment may not be important, and other timing or signal requirements may be emphasized such as minimizing a gate delay through the divided clock generator, maintaining alignment with other signals, minimizing transistor count, or making available a particular signal in an active low sense in a given intermediate stage of the divided clock generator, etc.

In yet other alternative embodiments, additional error prevention circuitry may be added to avoid entering forbidden states. Some forbidden states are prevented in the divided clock generator discussed above by using two inverse source clocks CK_SOURCE 140 and NCK_SOURCE 142 as inputs to the NAND gates 340, 342, 344 and 346. For example, several states of the four active low output signals CK_DRVL_ 230, NCK_DRVL_ 232, CK_DRVH_ 234 and NCK_DRVH_ 236 which would result in a short circuit between power and ground through the pullup PFET transistor 386 and a pulldown NFET transistor 390 would only occur it CK_SOURCE 140 and NCK_SOURCE 142 were simultaneously in the same state. Other forbidden states are prevented by adding inverted digital control signal inputs to a NAND gate (e.g., 340) so that the ck_fall and ck_rise digital control signals may not be simultaneously asserted. In alternative embodiments, additional or different error prevention circuitry may be added if desired, for example, to prevent a floating condition on the divided clock DCK2X 210 if all four digital control signals EN_CK_FALL 202, EN_NCK_FALL 204, EN_CK_RISE 206 and EN_NCK_RISE 208 are low simultaneously during normal operation.

Figure 7:
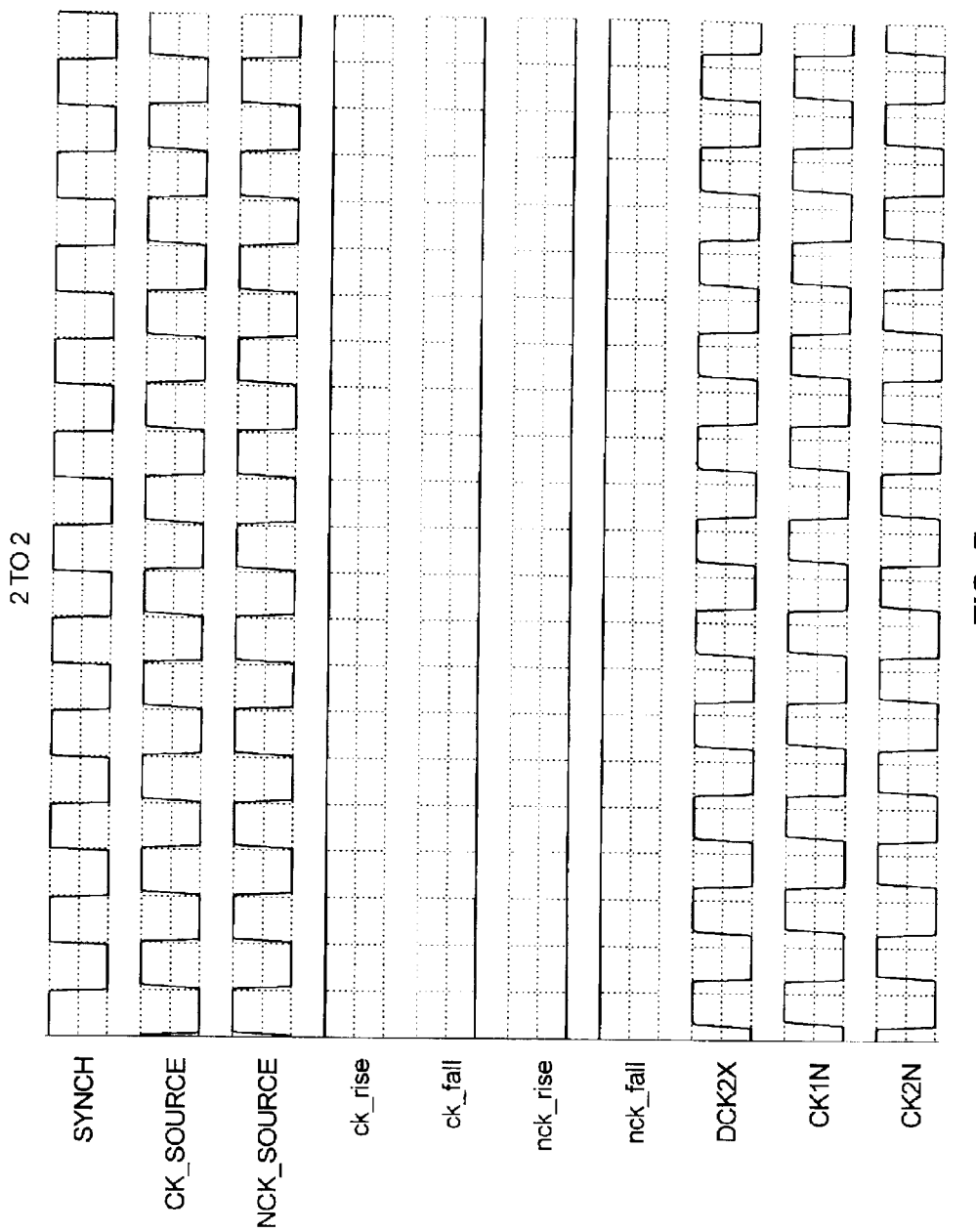
FIG. 7 is a timing diagram illustrating exemplary timing of various control and clock signals in the exemplary clock circuit of FIG. 3 during the generation of a divided clock signal having a ratio of 2 to 2 with the original clock signal.

The timing diagrams of FIGS. 7–10 will now be discussed to illustrate the generation of three different frequency ratios between the source clock CK_SOURCE 140 and the divided clock DCK2X 210. Referring now to FIG. 7, the generation of a divided clock with a ratio of 2:2 between the source clock CK1N 164 and the divided clock DCK2X 210 will be described. One side SYNCH 130 of the differential source clock is shown on the top line of the timing diagram, followed by both sides CK_SOURCE 140 and NCK_SOURCE 142 of the buffered differential source clock. As described above, the transitions of CK_SOURCE 140 and NCK_SOURCE 142 trigger the transitions in the divided clock DCK2X 210. Note that the buffered differential source clock CK_SOURCE 140 and NCK_SOURCE 142 is slightly delayed and degraded from the differential source clock SYNCH 130 by the buffer 136.

The four digital control signals ck_fall 220, nck_fall 222, ck_rise 224 and nck_rise 226 are set at static values to generate a divided clock DCK2X 210 with a 2:2 ratio, as illustrated in the timing diagram at the third line from the bottom. In this embodiment, ck_rise 224 and nck_fall 222 are both asserted and ck_fall 220 and nck_rise 226 are unasserted, so that the divided clock DCK2X 210 rises when the source clock CK_SOURCE 140 rises and falls when the source clock CK_SOURCE 142 falls. (The divided clock DCK2X 210 could have been generated with the same ratio, only inverted, by asserting ck_fall 220 and nck_rise 226 and unasserting ck_rise 224 and nck_fall 222.)

Although transitions of CK_SOURCE 140 and NCK_SOURCE 142 trigger the transitions in the divided clock DCK2X 210, DCK2X 210 is not aligned with CK_SOURCE 140 due to the delay through the divided clock generator. Note that in this exemplary embodiment, the divided clock DCK2X 210 is aligned with the buffered source clock CK1N 164, and has the same frequency due to the state of the four digital control signals ck_fall 220, nck_fall 222, ck_rise 224 and nck_rise 226.

Referring now to FIG. 8, the generation of a divided clock with a ratio of 3:2 between the source clock CK1N 164 and the divided clock DCK2X 210 will be described. In this timing diagram, the shifted versions (shifted_ck_rise 334, shifted_ck_fall 330, shifted_nck_rise 336 and shifted_nck_fall 332) of the four digital control signals are shown, in order to make the logic of the digital control signals with respect to the divided clock clear. Because of the latch chains 300, 302, 304 and 306, the four digital control signals are delayed by several clock cycles as they pass through the divided clock generator. As described above, the naming convention of the four digital control signals indicates what transitions should occur in the divided clock upon transitions of the source clock CK_SOURCE 140. If the original, unshifted digital control signals ck_fall 220, nck_fall 222, ck_rise 224 and nck_rise 226 were illustrated in the timing diagram, they would be offset from the source clock CK_SOURCE 140 and the resulting divided clock DCK2X 210, and the logic denoted by the naming conventions for the digital control signals with respect to the divided clock transitions would not be clear. This is illustrated in the timing diagram of FIG. 9, to be discussed hereinafter.

To generate the divided clock DCK2X 210 with a ratio of 3:2 between the source clock CK1N 164 (or the source clock CK_SOURCE 140) and the divided clock DCK2X 210, a regular repeating pattern is generated by the four digital control signals shifted_ck_rise 334, shifted_ck_fall 330, shifted_nck_rise 336 and shifted_nck_fall 332, as illustrated in the timing diagram of FIG. 8. The shifted_ck_rise 334 signal is asserted in a pulse 400, with the asserted state present and stable during a rising edge 402 of the source clock CK_SOURCE 140, causing a rising edge 404 in the divided clock DCK2X 210. The shifted_nck_fall 332 signal is then asserted in a pulse 410, with the asserted state present and stable during a falling edge 412 of the source clock CK_SOURCE 140 (and a rising edge of the inverse source clock NCK_SOURCE 142), causing a falling edge 414 in the divided clock DCK2X 210. The shifted_nck_rise 336 signal is then asserted in a pulse 420, with the asserted state present and stable during a falling edge 422 of the source clock CK_SOURCE 140 (and a rising edge of the inverse source clock NCK_SOURCE 142), causing a rising edge 424 in the divided clock DCK2X 210. Finally, the shifted_ck_fall 330 signal is asserted in a pulse 430, with the asserted state present and stable during a rising edge 432 of the source clock CK_SOURCE 140, causing a falling edge 434 in the divided clock DCK2X 210. The timing of the four shifted digital controls signals shifted_ck_rise 334, shifted_ck_fall 330, shifted_nck_rise 336 and shifted_nck_fall 332 with respect to the source clock CK_SOURCE 140 to generate DCK2X 210 with a 3:2 ratio is illustrated in the timing diagram of FIG. 8.

The resulting 3:2 ratio can be seen with respect to the source clock CK1N 164 and the divided clock DCK2X 210 at the bottom of the timing diagram of FIG. 8. Note that three cycles 440 occur in the source clock CK1N 164 in the same time that two cycles 442 occur in the divided clock DCK2X 210.

Figure 9:
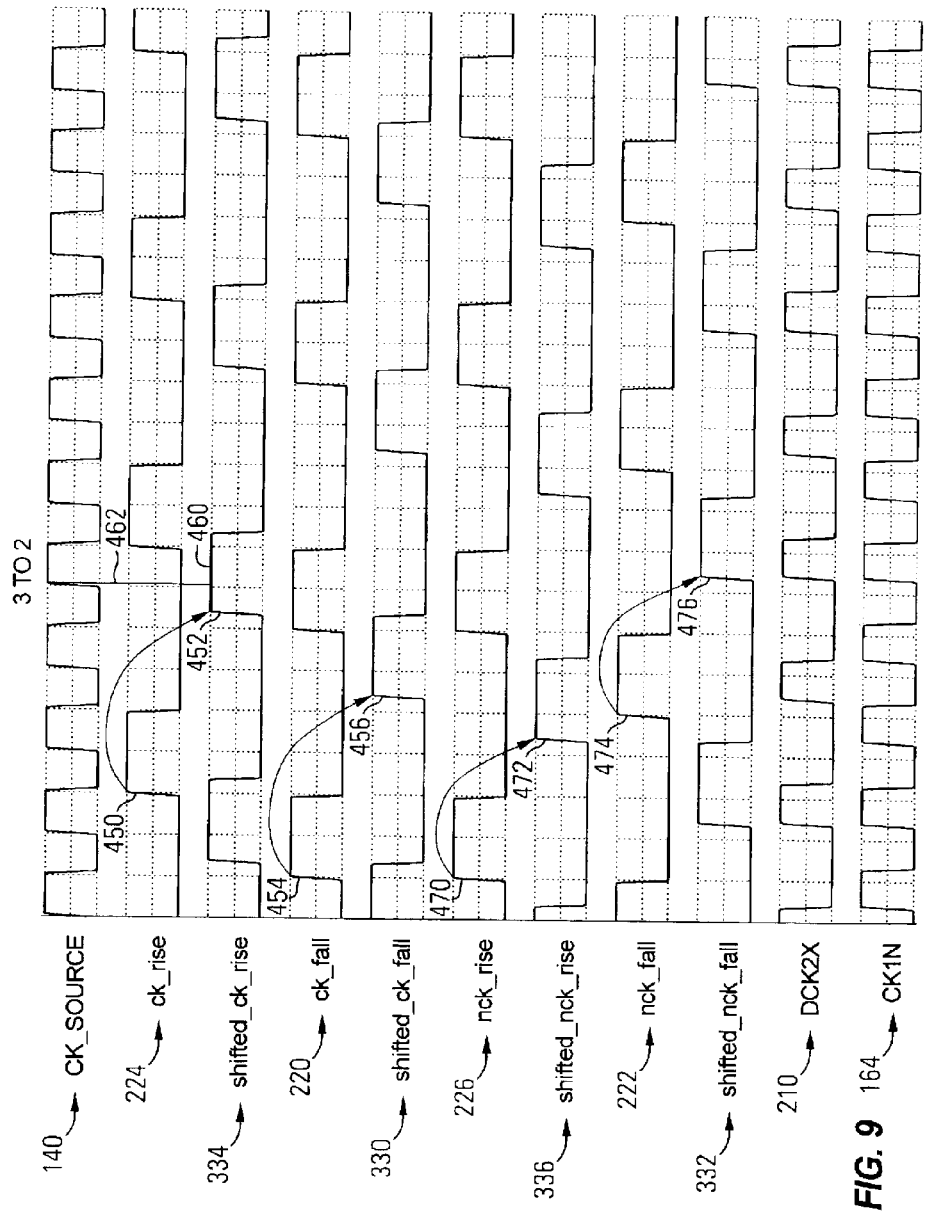
FIG. 9 is a timing diagram illustrating the shifting of control signals in the exemplary clock circuit of FIG. 3 during the generation of a divided clock signal having a ratio of 3 to 2 with the original clock signal.

Referring now to the timing diagram in FIG. 9 and the exemplary divided clock processing circuit 228 of FIG. 4, the shifting of the four digital control signals ck_fall 220, nck_fall 222, ck_rise 224 and nck_rise 226 in the latch chains 300, 302, 304 and 306 will be described. The four latches in latch chains 300 and 304 for the ck_fall 220 and ck_rise 224 digital control signals are clocked by rising edges of CK1N 164, CK2N 166, CK1N 164, then CK2N 166. This delays ck_fall 220 and ck_rise 224 by four transitions in the source clock CK1N 164 after the first transition of CK1N 164 when the digital control signals ck_fall 220 and ck_rise 224 are asserted. For example, pulse 450 of ck_rise 224 is delayed to pulse 452 of shifted_ck_rise 334, and pulse 454 of ck_fall 220 is delayed to pulse 456 of shifted_ck_fall 330. For the exemplary embodiment described above, this ensures that the state (e.g., 460) of the digital control signals is stable and present for the associated transition (e.g., 462) of the source clock CK_SOURCE 140.

The three latches in latch chains 302 and 306 for the nck_fall 222 and nck_rise 226 digital control signals are clocked by rising edges of CK1N 164, CK2N 166, then CK1N 164. This delays nck_fall 222 and nck_rise 226 by three transitions in the source clock CK1N 164 after the first transition of CK1N 164 when the digital control signals nck_fall 222 and nck_rise 226 are asserted. For example, pulse 470 of nck_rise 226 is delayed to pulse 472 of shifted_nck_rise 336, and pulse 474 of nck_fall 222 is delayed to pulse 476 of shifted_nck_fall 332.

Note that because the original, unshifted digital control signals ck_fall 220, nck_fall 222, ck_rise 224 and nck_rise 226 are aligned with the source clock CK_SOURCE 140, their states are not present and stable at the transitions of the source clock CK_SOURCE 140. (Rather, they are in transition when the source clock CK_SOURCE 140 transitions.) In contrast, the states (e.g., 460) of the shifted digital control signals are present and stable at the transitions (e.g., 462) of the corresponding source clock, shifted_ck_rise 334 and shifted_ck_fall 330 for CK_SOURCE 140, shifted_nck_rise 336 and shifted_nck_fall 332 for NCK_SOURCE 142. This also illustrates the delay between state changes in the unshifted digital control signals ck_fall 220, nck_fall 222, ck_rise 224 and nck_rise 226 and the result in the divided clock DCK2X 210.

Referring now to FIG. 10, the generation of a divided clock with a ratio of 4:2 between the source clock CK1N 164 and the divided clock DCK2X 210 will be described. To generate the divided clock DCK2X 210 with a ratio of 4:2 between the source clock CK1N 164 (or the source clock CK_SOURCE 140) and the divided clock DCK2X 210, a regular repeating pattern is generated by two of the digital control signals shifted_ck_rise 334, shifted_ck_fall 330, with the other two digital control signals shifted_nck_rise 336 and shifted_nck_fall 332 remaining unasserted, as illustrated in the timing diagram of FIG. 10. The shifted_ck_rise 334 signal is asserted in a pulse 490, with the asserted state present and stable during a rising edge 492 of the source clock CK_SOURCE 140, causing a rising edge 494 in the divided clock DCK2X 210. The shifted_ck_fall 330 signal is then asserted in a pulse 500, with the asserted state present and stable during a rising edge 502 of the source clock CK_SOURCE 140, causing a falling edge 504 in the divided clock DCK2X 210. This pattern is regularly repeated, with the timing of the pulses (e.g., 490 and 500) in the two shifted digital controls signals shifted_ck_rise 334 and shifted_ck_fall 330 required to generate DCK2X 210 with a 4:2 ratio illustrated in the timing diagram of FIG. 8.

The resulting 4:2 ratio can be seen with respect to the source clock CK1N 164 and the divided clock DCK2X 210 at the bottom of the timing diagram of FIG. 10. Note that four cycles 510 occur in the source clock CK1N 164 in the same time that two cycles 512 occur in the divided clock DCK2X 210.

Figure 11:
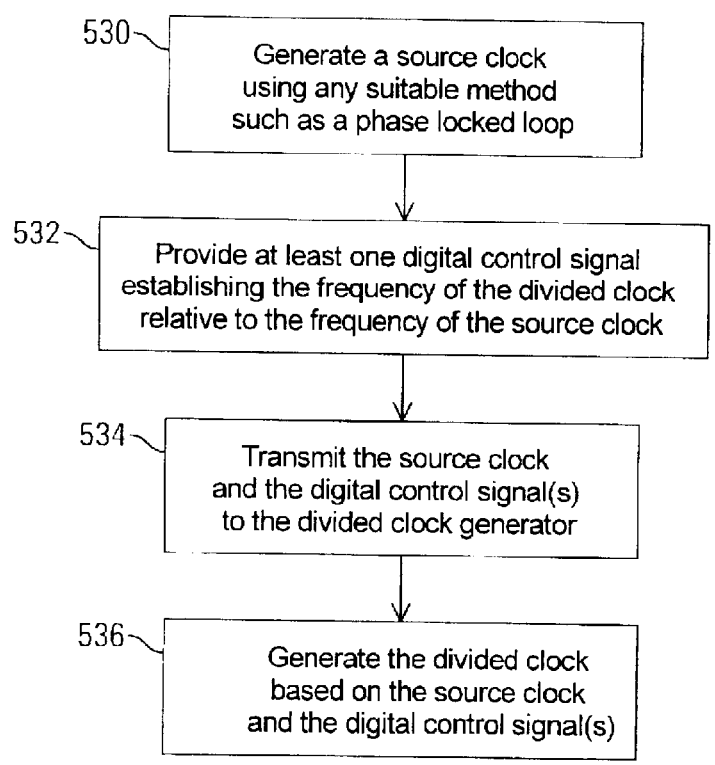
FIG. 11 is a flow chart of an exemplary operation for generating a divided clock.

The operation of the exemplary divided clock generator is summarized in the flow chart of FIG. 11. A source clock is generated 530 using any suitable method such as a phase locked loop. At least one digital control signal is provided 532 for determining a ratio between the source clock frequency and the divided clock frequency. The source clock and the digital control signal(s) are transmitted 534 to a remote circuit region in which the divided clock is to be used, and the divided clock is generated 536 in the remote circuit region based on the source clock and the digital control signal(s). The term "remote" does not necessarily imply any distance between the source of the digital control signals and source clock and the region in which the divided clock is to be used—rather, it indicates the independence of the divided clock generation from the source clock generator and digital control signal generator.

The generation of a divided clock as disclosed herein provides numerous benefits, including reducing the need for multiple noisy and complex analog source clock generators and reducing the number of sensitive analog clock signals that need to be routed across an electronic circuit. The divided clock generator disclosed herein is a small circuit which may be implemented wherever a divided clock is needed in an electronic circuit and provides for flexible selection of divided clock frequency. The divided clock may easily be aligned with a buffered source clock for use alongside the buffered source clock.

Figure 12:
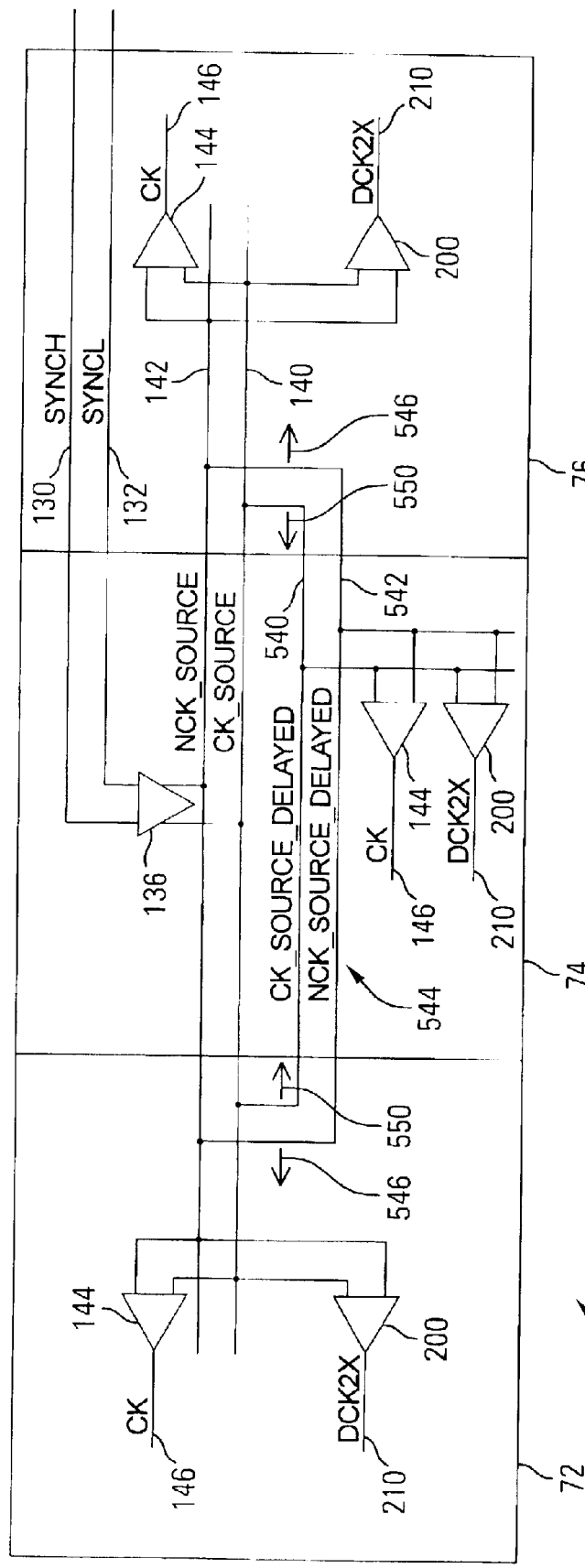
FIG. 12 is a block diagram of an exemplary DRAM control block enabling a selectable delay for a clock signals.

Referring now to FIG. 12, the divided clock generator also allows the designer of an electronic circuit access to skewed clock signals if desired. In this exemplary embodiment, the differential source clock made up of SYNCH 130 and SYNCL 132 are routed from a source clock generator such as a PLL to an L2I/O block 16 which contains three divided clock regions 72, 74 and 76. A source clock buffer 136 is located in the general area, such as in the center region 74, to provide a buffered source clock CK_SOURCE 140 and NCK_SOURCE 142. These clock signals CK_SOURCE 140 and NCK_SOURCE 142 are routed to each of the three divided clock regions 72, 74 and 76. Another buffer circuit 144 is located in each of the three divided clock regions 72, 74 and 76 to generate a buffered source clock CK 144 from the higher level clock signals CK_SOURCE 140 and NCK_SOURCE 142. A divided clock generation circuit 200 is also located in each of the three divided clock regions 72, 74 and 76 to generate a divided clock DCK2X 210 from the higher level clock signals CK_SOURCE 140 and NCK_SOURCE 142.

The use of multiple divided clock regions 72, 74 and 76 with multiple divided clock generators 200 and source clock buffers 144 enable the resulting source clock CK 146 and divided clock DCK2X 210 to be skewed or delayed as desired. This is accomplished by adjusting the wire delays between clock buffers (e.g., 136 and 144 or 200). In the exemplary embodiment, a delayed source clock CK_SOURCE_DELAYED 540 and NCK_SOURCE_DELAYED 542 are created by extending the conductors, such as in the loop 544 illustrated in FIG. 12. The size of the loop can be expanded 546 or contracted 550 to increase or reduce the wire delay in the CK_SOURCE_DELAYED 540 and NCK_SOURCE_DELAYED 542 source clock signals. This varies the skew or delay in corresponding clock signals CK 146 and DCK2X 210. Alternative embodiments may use other routing configurations to adjust the skew in the clock signals in the multiple local regions 72, 74 and 76.

Please note that all the source clock signals in the exemplary embodiment are actually buffered, including SYNCH 130 and SYNCL 132, although lower-level clock signals such as CK 144 have passed through several buffers. The term "buffered" is used to distinguish various levels of clock signals in the discussion herein, but the omission of the term "buffered" when describing any given clock signal does not necessarily mean that the given clock signal is unbuffered. Also note that in the exemplary embodiment, all clock generation circuits (e.g., 136, 144 and 200) are actually located in or near the center of the three divided clock regions 72, 74 and 76 to minimize clock skew in the regions.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for generating a divided clock signal, comprising:
   a buffer circuit having an input and an output, said input being connected to a source clock, said output providing at least one buffered source clock;
   a plurality of latch chains each having an input and an output, each of said plurality of latch chains comprising a plurality of latches connected in series, said plurality of latch chains being clocked by said at least one buffered source clock, said plurality of latch chain inputs being connected to a plurality of digital control signals; and
   a combinatorial logic block having a plurality of inputs connected to said plurality of latch chain outputs and to said source clock, and having an output providing a divided clock based on said source clock and aligned with said buffered source clock.

2. The apparatus of claim 1, wherein said at least one buffered source clock comprises a buffered source clock and an inverted buffered source clock that are edge aligned, and wherein said latches in each of said plurality of latch chains are alternately clocked by said buffered source clock and said inverted buffered source clock.

3. The apparatus of claim 1, wherein said source clock connected to said plurality of combinatorial logic block inputs comprises a positive and a negative side of differential conductors in said source clock.

4. An apparatus for generating a divided clock signal, comprising:
- a buffer circuit having an input and an output, said input being connected to a source clock, said output providing at least one buffered source clock;
- a plurality of latch chains each having an input and an output, said plurality of latch chains being clocked by said at least one buffered source clock, said plurality of latch chain inputs being connected to a plurality of digital control signal; and
- a combinatorial logic block having a plurality of inputs connected to said plurality of latch chain outputs and to said source clock, and having an output providing a divided clock based on said source clock and aligned with said buffered source clock, said combinatorial logic comprising a plurality of NAND gates connected to said plurality of latch chains, wherein an input of each of said NAND gates is connected to one of said plurality of latch chain outputs, and wherein a second input of each of said plurality of NAND gates is connected to said source clock.

5. The apparatus of claim 4, wherein another input of at least one of said plurality of NAND gates is connected to a reset signal.

6. The apparatus of claim 4, said combinatorial logic further comprising a pullup PFET and a pulldown NFET connected in series between a power and a ground, with a node between said pullup PFET and said pulldown NFET providing said divided clock, wherein a gate of said pullup PFET is connected to an output of one of said NAND gates and a gate of said pulldown NFET is connected to an output of another of said plurality of NAND gates.

7. The apparatus of claim 6, wherein said plurality of digital control signals comprises four digital control signals, said combinatorial logic further comprising an AND gate combining two of said plurality of latch chain outputs and a NAND gate combining another two of said plurality of latch chain outputs, said gate of said pullup PFET being connected to an output of said AND gate, said gate of said pulldown NFET being connected to an output of said NAND gate.

8. The apparatus of claim 7, wherein a first of two digital control signals connected through one of said two latch chains to said AND gate causes said divided clock to transition low when said source clock falls, and a second of two digital control signals connected through another of said two latch chains to said AND gate causes said divided clock to transition low when an inverted version of said source clock falls.

9. The apparatus of claim 7, wherein a first of two digital control signals connected through one of said two latch chains to said NAND gate causes said divided clock to transition high when said source clock rises, and a second of two digital control signals connected through another of said two latch chains to said NAND gate causes said divided clock to transition high when an inverted version of said source clock rises.

10. An apparatus for generating a divided clock signal, comprising:
- a buffer circuit having an input and an output, said input being connected to a source clock, said output providing at least one buffered source clock;
- a plurality of latch chains each having an input and an output, said plurality of latch chains being clocked by said at least one buffered source clock, said plurality of latch chain inputs being connected to a plurality of digital control signals; and
- a combinatorial logic block having a plurality of inputs connected to said plurality of latch chain outputs and to said source clock, and having an output providing a divided clock based on said source clock and aligned with said buffered source clock, wherein a gate delay through said buffer circuit is equal to a gate delay through said plurality of latch chains and said combinatorial logic block.

11. The apparatus of claim 1, further comprising transmission lines between a source of said divided clock and a source of said plurality of digital control signals to a remote circuit region in which said divided clock is to be used, said plurality of latch chains and said combinatorial logic block being located in said remote circuit region.

12. A method for generating a clock signal, comprising:
- generating a source clock signal;
- providing at least one digital control signal for determining a ratio between a frequency of said clock signal and a frequency of said source clock signal, wherein said at least one digital control signal causes said clock signal to rise when said at least one digital control signal is asserted and said source clock transitions;
- transmitting said source clock signal and said at least one digital control signal to a remote circuit region in which said clock signal is to be used; and
- generating said clock signal is said remote circuit location bases on said source clock signal and said at least one digital control signal.

13. The method of claim 12, said generating said clock signal comprising causing said clock signal to transition based on site of said at least one digital control signal when said source clock signal transitions.

14. A method for generating a clock signal comprising:
- generating to source clock signal;
- providing at least one digital control signal for determining a ratio between a frequency of said clock signal and frequency of said source clock signal, wherein said at least one digital control signal causes said clock signal to fall when said at least one digital control signal is asserted and said source clock signal transitions;
- transmitting said source clock signal and said at least one digital control signal to a remote circuit region in which said clock signal is to be used; and
- generating said clock signal in said remote circuit location based on said source clock signal and said at least one digital control signal.

15. The method of claim 12, further comprising latching said at least one digital control signal through a series of latches controlled by said source clock signal.

16. The method of claim 15, further comprising generating a delayed version of said source clock signal, wherein said series of latches is controlled by said delayed version of said source clock signal, and wherein said clock signal is aligned with said delayed version of said source clock signal.

17. A method for generating a source clock signal, comprising:
- generating a source clock signal;
- providing at least one digital control signal for determining a ratio between a frequency of said clock signal and a frequency of said source clock signal;
- combining said at least one digital control signal with said source clock signal using at least one digital logic gate;
- transmitting said source clock signal and said at least one digital control signal to a remote circuit region in which said clock signal is to be used; and generating said clock signal in said remote circuit location based on said source clock signal and said at least one digital control signal.

18. The method of claim 17, wherein said at least one digital control signal comprises a plurality of digital control signals, and wherein said generating said clock signal comprises combining said plurality of digital control signals to provide said clock signal.

* * * * *